Patented July 18, 1944

2,354,014

UNITED STATES PATENT OFFICE 2,354,014

METHOD OF FOOD PRODUCT PRESERVATION

Edward C. Haines, Moorestown, N. J.

No Drawing. Application July 29, 1942,
Serial No. 452,786

1 Claim. (Cl. 99—155)

The present invention relates to the preservation of foods and the like and is especially directed to the treatment of perishable fruit and vegetable products, and of fruits and vegetables themselves, to prevent their fermentation, decay or other deterioration.

Several methods are now in common use for preserving foods, but none of them is entirely satisfactory since those in which a heat treatment is used to destroy the bacteria, yeast and the like normally present also destroy vitamins, enzymes and other salutary constituents and decompose essential oils, and even if they do not thoroughly cook the food, they at least deprive it of its freshness. On the other hand, chemical preservatives such as benzoate of soda, sulfur dioxide and the like, if used in sufficient quantities to be effective as deterrents to fermentation and decay, so adversely affect the flavor of the food as to be objectionable, while there is furthermore respectable authority that the quantities of these substances required to insure comparative safety from fermentation and decay are possibly harmful to the consumer.

It is therefore a principal object of the invention to provide a method of effectively preserving food products without danger to the health of the ultimate consumer yet which retains the unstable and valuable constituents and does not destroy the normal flavor.

Another object is the provision of a novel food product devoid or substantially devoid of living micro-organisms while still in its fresh, uncooked condition.

Further objects, purposes and advantages of the invention will more fully appear as the following description of its practice proceeds with especial reference to its applicability to the preservation of fresh fruit juices, such as sweet cider, and fresh whole fruits, such as cherries, peaches, or the like.

Fresh fruits and vegetables contain relatively unstable vitamins, enzymes and generally comparable substances of great value to health but which are difficult, if not impossible, to retain or replace and are readily destroyed or transformed by heat, atmospheric oxidation, fermentation and/or other chemical action; nevertheless some treatment is necessary to prevent spoilage before the fruits or vegetables, or products made therefrom, reach the ultimate consumer. However, in view of danger to public health all substances capable of destroying bacteria and yeast without heating are not available for use as preservatives, and thus benzoate of soda and sulfur dioxide even though possibly harmful to the consumer and recognized as incapable of preserving the food indefinitely, are perhaps more widely used than other substances as preservative agents for food because of the greater danger to health involved in the use of other known preservatives.

In accordance with my invention, however, I use to effect the desired preservation a small quantity of a substance of relatively unstable character which, after it has performed its function of destroying any bacteria, yeast, fungus spores and the like in the food, but without impairing the natural vitamins, enzymes, etc. present therein, becomes transformed to a relatively innocuous substance, whereby the food may be treated, and responds to such treatment, long after its harvesting or production in exactly the same way as when freshly harvested and/or produced.

More specifically, to preserve fresh fruit juices such, for example, as fresh cider, I add to the cider as it comes from the press, or later if preferred and even after some fermentation has taken place, a small percentage of a suitable relatively soluble organic oxide of a nature such that its immediate effect is to destroy the living organisms in the fluid but which by hydrolysis or otherwise is soon converted to another substance entirely innocuous with respect not only to living micro-organisms such as bacteria or yeast but to the consumer as well. Consequently it is of little, if any, moment that the substance may temporarily, before its conversion, render the cider, juices or the like unfit for human consumption. A compound capable of fulfilling these exacting requirements is propylene oxide or, as it is sometimes known, propene oxide:

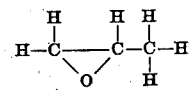

of which I preferably use about 0.5% to about 1.0% by volume for preserving cider, the juices of citrus fruits and the like.

The cider or fruit juice should be packaged and sealed in airtight containers, such as glass bottles, cans or the like immediately after introduction of the preservative to thereby prevent subsequent air-borne or other contamination, and the filled and sealed containers are then stored for a short time, usually not more than a few days, to insure the conversion of the oxide before the product is to be used. This storage period will be longer or shorter, depending upon whether the temperature conditions are low or high, but it is normally not necessary to supply artificial heat, as even in cold weather the conversion takes place rapidly enough to enable it to reach completion in the time generally elapsing between the packaging of products of this kind and their ultimate delivery to the consumer. The reaction, when propylene oxide is used, is principally if not entirely a hydrolysis presumably substantially according to the following equation:

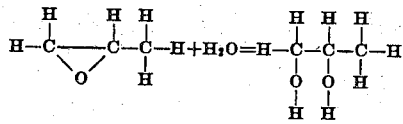

The water entering into the reaction is of course derived from the cider or other juice itself, and the end product, propylene glycol or, under the nomenclature approved by the International Union of Chemistry, 1, 2 propane diol, is infinitely soluble in water, colorless, tasteless, odorless and entirely innocuous when taken into the human body as a minor constituent of a food or drink. Thus, after the cider with its propylene oxide has remained in the sealed container a sufficient time for the organisms present to be destroyed and the oxide to become hydrolized, it can be opened at once, or at any later time, substantially without regard to the conditions under which it has been kept, provided air-borne and other contamination has been excluded. In fact containers of cider treated in this way have been opened as much as six months after sealing and the contents found in perfect condition, substantially indistinguishable from newly pressed cider and distinguishable therefrom by chemical analysis only by the small quantity of propylene glycol present and the absence of living organisms.

Upon standing after exposure to air, however, the treated cider began to ferment in substantially the same way as untreated fresh cider and after fermentation seemed exactly like such cider following its similar fermentation. This behavior indicated the treated cider received some yeast or other fermenting organisms from the atmosphere after being opened, for the conditions under which it was kept before opening were not such as to inhibit fermentation had it contained viable fermentants. It is thus evident the practice of the invention includes not only a sterilization of the material being treated, but is followed or accompanied by a decomposition to an entirely innocuous end product of the chemical sterilizing agent used and, further, does not require heat treatment or other operations of a nature likely to destroy or impair the values of contained vitamins, enzymes, essential oils or the like. In this connection it may be well to note that the authorities charged with administration of the pure food laws of the United States, after exhaustive investigation and tests, have determined that even much larger quantities of propylene glycol than are present after treatment of food in accordance with the invention are non-toxic and not objectionable or repugnant to law.

As far as is known, no comparable ruling as to propylene oxide has been delivered and in view of its unstable nature in the presence of water, its volatility and possibly offensive character in other respects, it is perhaps unlikely that it ever will be, so for these reasons it is definitely contemplated by the invention that a sufficient time elapse between the packing and consumption of the treated foods to insure conversion of all propylene oxide to the harmless glycol.

For preserving whole fruits, vegetables and the like as distinguished from juices and other fluids, including all perishable non-fluid foods suitable for treatment in accordance with the invention, I prefer to make up a fresh water solution of propylene oxide, preferably one containing about 0.5% to about 1% of this substance, to place a quantity of this solution in a fluid-tight container, then to introduce therein the articles to be preserved, supplying sufficient of the solution to fill all voids and, when the container is full, to seal it up to prevent escape of any fluid and exclude air. In this way the articles are sterilized by the action of the propylene oxide in the solution and are thereafter kept in perfect condition by the sterile fluid surrounding them; after transformation of the oxide to the glycol, which occurs within a few days, they may be used at any time, in the same manner and to the same effect as if actually freshly produced and/or harvested. It will be understood that the fluid which consists merely of a weak solution of propylene glycol after the container is opened will normally be discarded.

While I have herein described my invention with considerable particularity, especially as it relates to the preservation of cider and other fruit juices, fruits, vegetables and the like, it will be understood it is not intended thereby to limit or confine the invention in any way as it may be utilized for preserving perishable goods of any character suitable for treatment in accordance therewith, while modifications and changes in the specific manner of practising the invention will readily occur to those skilled in the art and may be adopted if desired without departing from its spirit and scope as defined in the appended claim.

Having thus described my invention, I claim and desire to protect by Letters Patent of the United States:

The method of preserving fruit juices for human consumption which consists in mixing with the fresh juice less than about 1% by volume of propylene oxide, immediately sealing the mixture in an an air-tight container and thereafter maintaining it therein until it is to be consumed after a time at least sufficient for the oxide to hydrolyze to propylene glycol.

EDWARD C. HAINES.